(12) United States Patent
Abernethy, Jr. et al.

(10) Patent No.: US 8,161,405 B2
(45) Date of Patent: Apr. 17, 2012

(54) ACCEPTING A USER'S SELECTION OF SORT OPTIONS FOR SORTING A TABLE

(75) Inventors: Michael N. Abernethy, Jr., Pflugerville, TX (US); Travis M. Grigsby, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 12/270,454

(22) Filed: Nov. 13, 2008

(65) Prior Publication Data

US 2010/0122211 A1  May 13, 2010

(51) Int. Cl.
*G06F 3/048* (2006.01)
*G06F 17/00* (2006.01)

(52) U.S. Cl. ......... 715/810; 715/227; 715/228; 715/764

(58) Field of Classification Search .................. 715/227, 715/228, 764, 810
See application file for complete search history.

(56) References Cited

U.S. PATENT DOCUMENTS

| | | | |
|---|---|---|---|
| 6,285,367 B1 * | 9/2001 | Abrams et al. ................ 715/854 |
| 6,898,593 B1 | 5/2005 | Mulukutla et al. |
| 7,594,191 B2 * | 9/2009 | Leidig et al. .................. 715/825 |
| 7,672,944 B1 * | 3/2010 | Holladay et al. ....... 707/999.007 |
| 2004/0220908 A1 | 11/2004 | Finlay et al. |
| 2004/0243616 A1 | 12/2004 | Benhase et al. |
| 2005/0097100 A1 | 5/2005 | Galindo-Legaria et al. |
| 2005/0125397 A1 | 6/2005 | Gross et al. |
| 2006/0265413 A1 * | 11/2006 | Blencowe ..................... 707/102 |
| 2006/0294069 A1 * | 12/2006 | Carlson et al. .................... 707/3 |
| 2007/0104120 A1 | 5/2007 | Shah-Heydari |

OTHER PUBLICATIONS

List Support for LAN NetView Fix Browser in Dynamic DB; IBM Technical Disclosure Bulletin; vol. 37, No. 4B; Apr. 1994; pp. 311-312.

* cited by examiner

*Primary Examiner* — Steven Sax
*Assistant Examiner* — Grant D Johnson
(74) *Attorney, Agent, or Firm* — DeLizio Gillman, PLLC

(57) ABSTRACT

Methods, systems, and computer program products are provide for accepting a user's selection of sort options for sorting a table according to embodiments of the present invention. Embodiments include selecting a representative shape for displaying sort options; identifying one or more columns in the table available for selection as a key for sorting; displaying, together in a GUI, identifications of the one or more columns and the representative shape; and receiving, as a user's selection of one of the columns as a key for sorting, an invocation of a GUI control associated with an identification of the selected columns.

9 Claims, 10 Drawing Sheets

| First Name | Last Name | Age | City | Hobby | College |
|---|---|---|---|---|---|
| Mike | Smith | 29 | Pflugerville | Golf | Duke |
| Travis | Jones | 28 | Austin | Sewing | Ohio State |
| LeBron | Johnson | 27 | Austin | Fishing | Florida |
| Rick | Williams | 28 | Round Rock | Sailing | Georgetown |
| Matt | Timberlake | 29 | Austin | Basketball | UNC |
| Kevin | Sears | 30 | Dallas | Football | Wake Forest |
| Jake | Malakar | 30 | Dallas | Football | UCLA |
| Wes | Mills | 31 | Austin | Reading | USC |
| Aaron | Miller | 32 | Austin | TV | Texas |
| Zach | Paulson | 32 | Chicago | Reading | Arkansas |

| First Name | Last Name | Age | City | Hobby | College |
|---|---|---|---|---|---|
| LeBron | Johnson | 27 | Austin | Fishing | Florida |
| Travis | Jones | 28 | Austin | Sewing | Ohio State |
| Rick | Williams | 28 | Round Rock | Sailing | Georgetown |
| Matt | Timberlake | 29 | Austin | Basketball | UNC |
| Mike | Smith | 29 | Pflugerville | Golf | Duke |
| Jake | Malakar | 30 | Dallas | Football | UCLA |
| Kevin | Sears | 30 | Dallas | Football | Wake Forest |
| Wes | Mills | 31 | Austin | Reading | USC |
| Aaron | Miller | 32 | Austin | TV | Texas |
| Zach | Paulson | 32 | Chicago | Reading | Arkansas |

ACCEPTING A USER'S SELECTION OF SORT OPTIONS FOR SORTING A TABLE

BACKGROUND OF THE INVENTION

1. Field of the Invention

The field of the invention is data processing, or, more specifically, methods, apparatus, and products for accepting a user's selection of sort options for sorting a table.

2. Description of Related Art

A computer database is a structured collection of records or data that is stored in a computer system. Data may be extracted from the database and presented to a user in the form of a table where information about a particular entity is represented in columns and rows. The columns of the table enumerate the various attributes of the entity, and a row is an actual instance of the entity that is represented by the relation. The rows of the table may then be sorted according to the values in one or more columns of the table. Current user interfaces, however, provide controls for selecting the sort options for the table that are not user-friendly and make understanding the effect of sorting difficult.

SUMMARY OF THE INVENTION

Methods, systems, and computer program products are provided for accepting a user's selection of sort options for sorting a table according to embodiments of the present invention. Embodiments include selecting a representative shape for displaying sort options; identifying one or more columns in the table available for selection as a key for sorting; displaying, together in a GUI, identifications of the one or more columns and the representative shape; and receiving, as a user's selection of one of the columns as a key for sorting, an invocation of a GUI control associated with an identification of the selected columns.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 4 sets forth a block diagram of the display of a GUI useful in accepting a user's selection of sort options for sorting a table according to embodiments of the present invention.

FIG. 8 sets forth a block diagram of the table sorted according to the primary key selected in the example of FIG. 5, the secondary key selected in the example of FIG. 6, and the tertiary key selected in the example of FIG. 7.

DETAILED DESCRIPTION OF EXEMPLARY EMBODIMENTS

Figure 1:
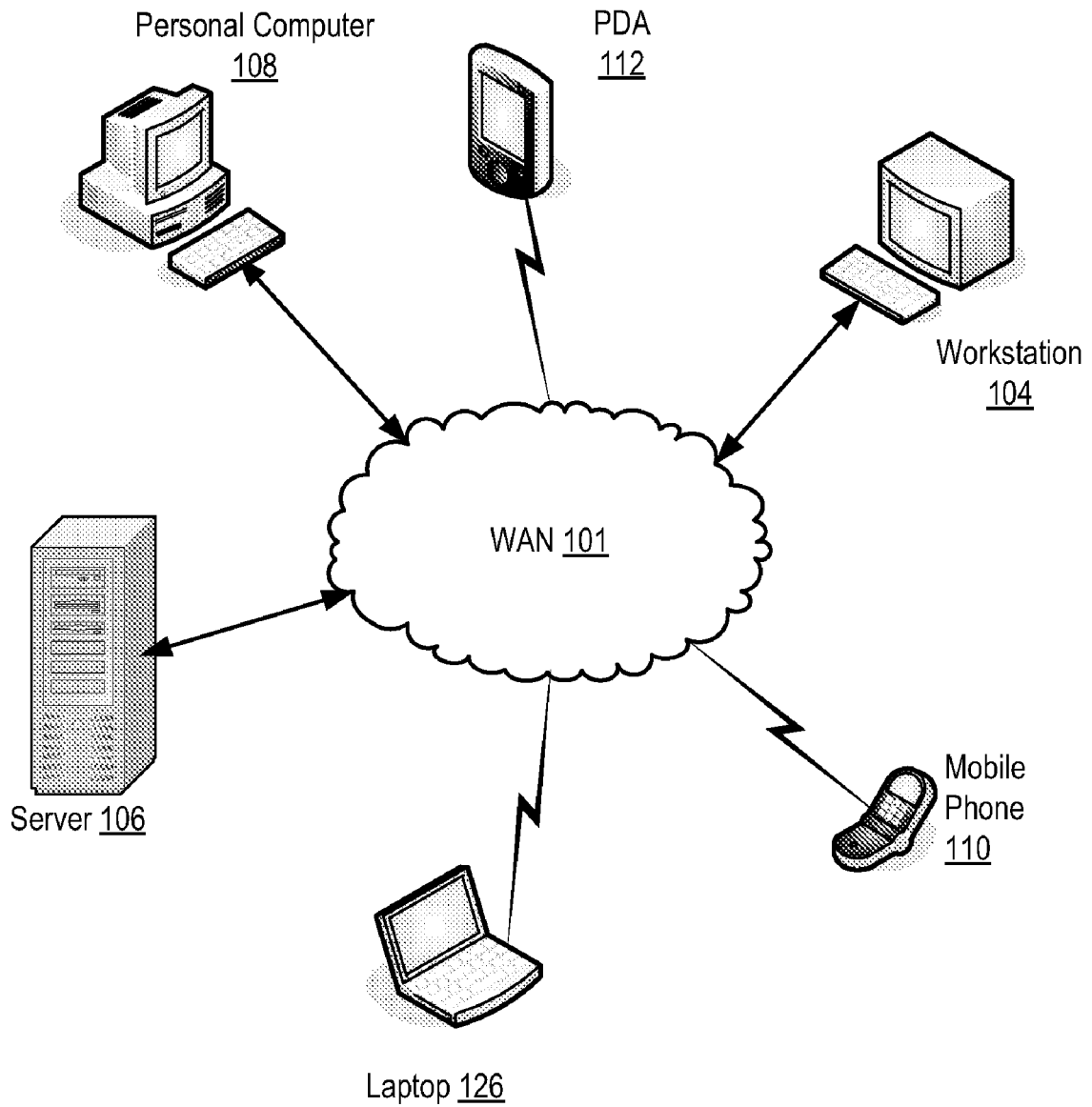
FIG. 1 sets forth a network diagram of a system for accepting a user's selection of sort options for sorting a table according to embodiments of the present invention according to embodiments of the present invention.

Exemplary methods, apparatus, and computer program products for accepting a user's selection of sort options for sorting a table according to embodiments of the present invention in accordance with the present invention are described with reference to the accompanying drawings, beginning with FIG. 1. FIG. 1 sets forth a network diagram of a system for accepting a user's selection of sort options for sorting a table according to embodiments of the present invention. The system of FIG. 1 includes a number of automated computing devices (108, 112, 104, 110, 126, and 106) coupled for data communications to a wide area network ('WAN'). The automated computing devices include a personal computer (108), a personal digital assistant ('PDA'), a workstation (108), a mobile phone (110), a laptop (126), and a server (106).

Each of the automated computing devices (108, 112, 104, 110, 126, and 106) of FIG. 1 is capable of retrieving data from a database and presenting the data in the form of a table. Each of the automated computing devices (108, 112, 104, 110, 126, and 106) of FIG. 1 is also capable of sorting the rows of the table in dependence upon a user selection of one or more of the properties of the columns designated as a key for sorting or a sort key.

Each of the automated computing devices (108, 112, 104, 110, 126, and 106) of FIG. 1 is capable of supporting a sort option module, computer program instructions for accepting a user's selection of sort options for sorting a table according to embodiments of the present invention. Such a sort option module includes computer program instructions for selecting a representative shape for displaying sort options; identifying one or more columns in the table available for selection as a key for sorting; displaying, together in a GUI, identifications of the one or more columns and the representative shape; and receiving, as a user's selection of one of the columns as a key for sorting, an invocation of a GUI control associated with an identification of the selected column.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Accepting a user's selection of sort options for sorting a table in accordance with the present invention is generally implemented with computers, that is, with automated computing machinery. For further explanation, therefore, FIG. 2 sets forth a block diagram of automated computing machinery comprising an exemplary computer (152) useful in accepting a user's selection of sort options for sorting a table according to embodiments of the present invention. The computer (152) of FIG. 2 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a database application (197), a module of computer program instructions for storing data and capable of retrieving that data and presenting the retrieved data in a table. Examples of databases that may be used with embodiments of the present invention include DB2 available from IBM®, Microsoft Access, and others as will occur to those of skill in the art.

Figure 2:
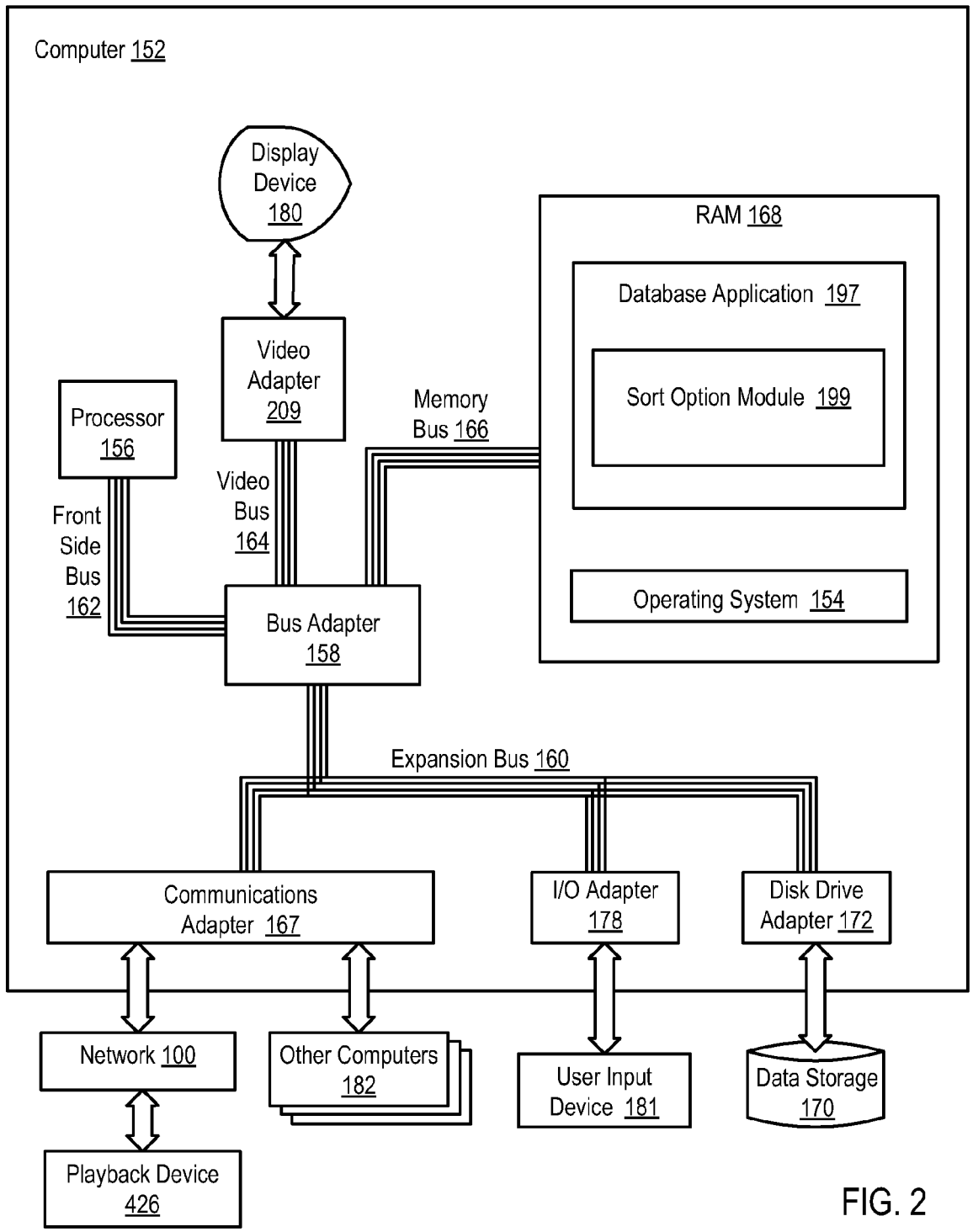
FIG. 2 sets forth a block diagram of automated computing machinery comprising an exemplary computer useful in accepting a user's selection of sort options for sorting a table according to embodiments of the present invention.

The database application (197) of FIG. 2 includes a sort option module (199), a module of computer program instructions for accepting a user's selection of sort options for sorting a table according to embodiments of the present invention. The sort option module (199) includes computer program instructions for selecting a representative shape for displaying sort options; identifying one or more columns in the table available for selection as a key for sorting; displaying, together in a GUI, identifications of the one or more columns and the representative shape; and receiving, as a user's selection of one of the columns as a key for sorting, an invocation of a GUI control associated with an identification of the selected columns.

Also stored in RAM (168) is an operating system (154). Operating systems useful with embodiments of the present invention include UNIX™, Linux™, Microsoft XP™, AIX™, IBM's i5/OS™, and others as will occur to those of skill in the art. The operating system (154), database application (197), and sort option module (199) in the example of FIG. 2 are shown in RAM (168), but many components of such software typically are stored in non-volatile memory also, such as, for example, on a disk drive (170).

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for accepting a user's selection of sort options for sorting a table according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for accepting a user's selection of sort options for sorting a table according to embodiments of the present invention include modems for wired dial-up communications, Ethernet (IEEE 802.3) adapters for wired data communications network communications, and 802.11 adapters for wireless data communications network communications.

Figure 3:
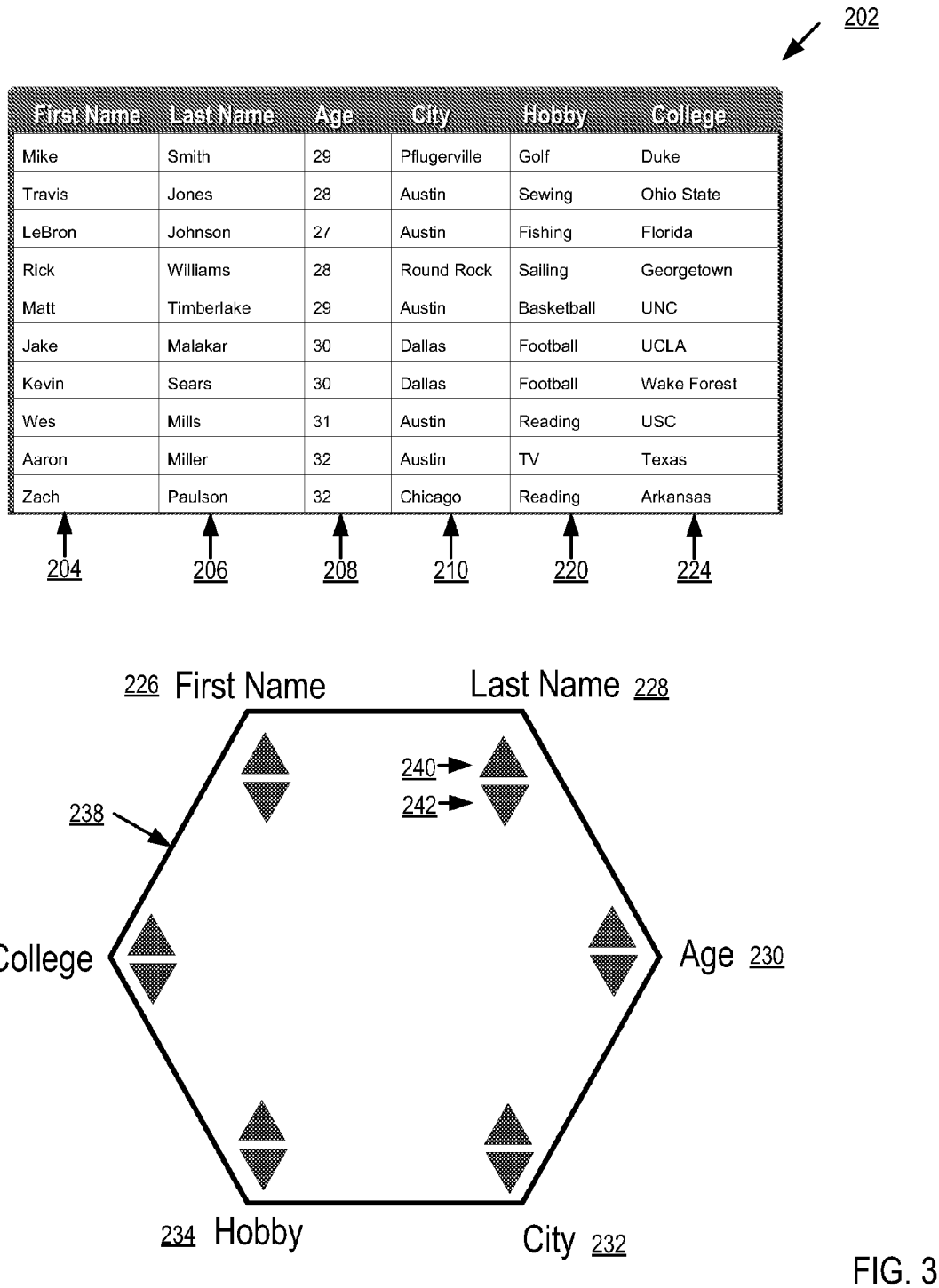
FIG. 3 sets forth a block diagram of the display of a GUI illustrating aspects of accepting a user's selection of sort options for sorting a table according to embodiments of the present invention.

For further explanation, FIG. 3 sets forth a block diagram of the display of a GUI illustrating aspects of accepting a user's selection of sort options for sorting a table according to embodiments of the present invention. The example display of FIG. 3 includes a table (202) to be sorted according to user selections of sort options according to embodiments of the present invention. The table (202) of FIG. 3 includes information about people and has six columns each containing a different type of information about each person in the table. The table (202) of FIG. 3 includes a column (204) for the first name of each person, a column (206) for the last name of each person, a column (208) for the age (230) of the person, a column (210) for the city in which the person lives, a column (220) for an identification of a hobby of the person, and a column (224) for the college the person attended. The specific columns and number of columns of the table of FIG. 3 are for explanation and not for limitation. Accepting a user's selection of sort options for sorting a table according to embodiments of the present invention may be used to sort tables having any number of rows and columns as will occur to those of skill in the art.

In the example display of FIG. 3, a representative shape (238) for displaying sort options available to a user has been selected and is displayed to the user. The representative shape (238) selected in the example of FIG. 3 is a polygon having the same number of vertices as columns in the table. The selection of a polygon having the same number of vertices as columns in the table in the example of FIG. 3 is for explanation and not for limitation, representative shapes for displaying sort options available to a user may include lines, curves, circles, polygons having a number of vertices different from the number of columns, and others as will occur to those of skill in the art.

In the example of FIG. 3, the columns in the table available for selection as a key for sorting are identified and identifications (226, 228, 230, 232, 234, and 236) of those columns (204, 206, 208, 210, 220 and 224) are displayed together in the GUI with the representative shape (238). In the example of FIG. 3, each of the columns (204, 206, 208, 210, 220 and 224) of the table (202) are available as keys for sorting and identifications (226, 228, 230, 232, 234, and 236) of those columns are themselves implemented as GUI controls that a user may invoke to select the identified column as a key for sorting the table. The example of FIG. 3 includes a GUI control (226) for accepting a user's selection of the column (204) for first name as a key for sorting, a GUI control (228) for accepting a user's selection of the column (206) for last name as a key for sorting, a GUI control (230) for accepting a user's selection of the column (208) for age as a key for sorting, a GUI control (232) for accepting a user's selection of the column (210) for city as a key for sorting, a GUI control (234) for accepting a user's selection of the column (220) for hobby as a key for sorting, and a GUI control (236) for accepting a user's selection of the column (224) for college as a key for sorting.

Each of the GUI controls (226, 228, 230, 232, 234, and 236) containing identifications of the columns of the table are capable of receiving, as a user's selection of one of the columns as a key for sorting, an invocation of that GUI control associated with an identification of the selected column. Such an invocation the GUI control may be carried out through the use of a user input device such as a mouse. A mouse may be used to direct a cursor over the identification of the column to be selected in the display of the GUI and a user may use a button on the mouse to invoke the GUI control to which the cursor is directed.

Each of the GUI controls (226, 228, 230, 232, 234, and 236) has associated with it additional GUI controls (240 and 242) for receiving from a user an instruction to sort on the selected column in ascending (240) or descending (242) order. Such a GUI control allows a user to easily select the directional sort order of the column selected as the key for sorting the table.

In the example of FIG. 3 the representative shape (238) is displayed below the table (202). This is for ease of explanation and not for limitation. In fact, accepting a user's selection of sort options for sorting a table according to embodiments of the present invention may include displaying the representative shape in any number of ways relative to the table or not displaying the representative shape with the table at all. For further explanation, FIG. 4 sets forth a block diagram of the display of a GUI useful in accepting a user's selection of sort options for sorting a table according to embodiments of the present invention. In the example display of FIG. 4 the representative shape is displayed on top of the table to be sorted. Such a display may provide a user with increased awareness of the relationship between the identifications of the columns available for sorting and the actual columns of the table.

Figure 5:
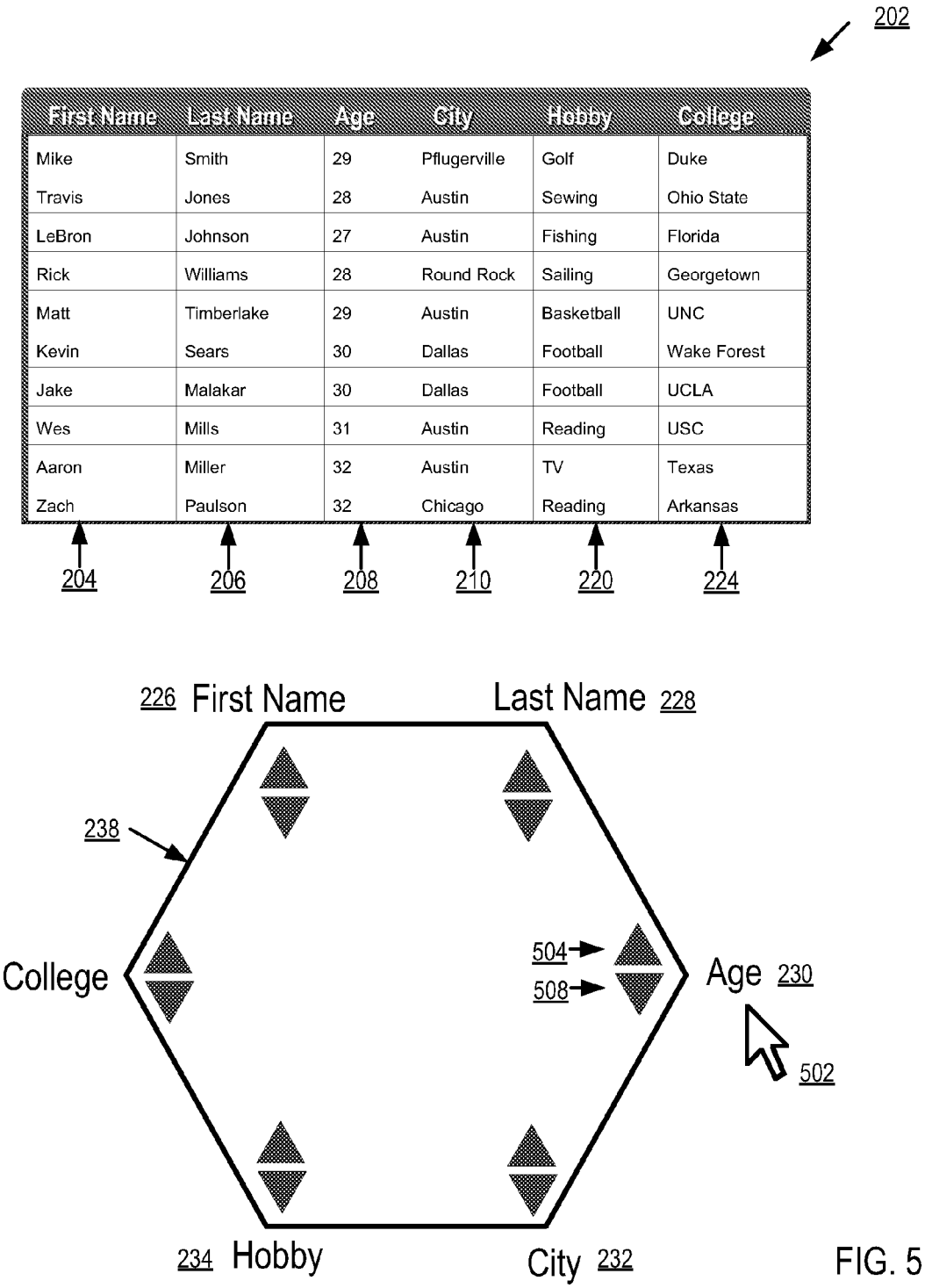
FIG. 5 sets forth a block diagram of the display of a GUI useful in accepting a user's selection of a primary key for sorting a table according to embodiments of the present invention.

Many database applications provide the ability to sort on multiple keys. That is, a table may be first sorted on a primary key, then sorted on a secondary key, and then on a tertiary key and so on as will occur to those of skill in the art. FIGS. 5-8 illustrate an example of accepting a user's selection of sort options for sorting a table with a primary key, a secondary key and a tertiary key. FIG. 5 sets forth a block diagram of the display of a GUI useful in accepting a user's selection of sort options for sorting a table according to embodiments of the present invention. The example display of FIG. 5 includes a table (202) to be sorted according to a user's selection of a primary key, a secondary key and a tertiary key. The table (202) of FIG. 5 includes information about people and has six columns each containing a different type of information about each person in the table. The table (202) of FIG. 5 includes a column (204) for the first name of each person, a column (206) for the last name of each person, a column (208) for the age (230) of the person, a column (210) for the city in which the person lives, a column (220) for an identification of a hobby of the person, and a column (224) for the college the person attended. The specific columns and number of columns of the table of FIG. 5 are for explanation and not for limitation.

In the example display of FIG. 5, a representative shape (238) for displaying sort options available to a user has been selected and is displayed to the user. The example representative shape (238) selected in the example of FIG. 5 is a six sided polygon having the same number of vertices as columns in the table. All six columns are available for selection by the user as the primary key for sorting the table. In the example of FIG. 5, the columns in the table available for selection as the primary key for sorting are identified and identifications (226, 228, 230, 232, 234, and 236) of those columns (204, 206, 208, 210, 220 and 224) are displayed together in the GUI with the representative six-sided shape (238). In the example of FIG. 5, each of the columns (204, 206, 208, 210, 220 and 224) of the table (202) are available as keys for sorting and identifications (226, 228, 230, 232, 234, and 236) of those columns are themselves implemented as GUI controls that a user may invoke to select the identified column as the primary key for sorting the table.

The example displayed GUI of FIG. 5 includes a GUI control (230) for accepting a user's selection of the column (208) for age as the primary key for sorting. In the example of FIG. 5 the GUI control (230) for selecting age as the primary key for sorting the table is invoked by a user using a mouse cursor (502). The column for age (208) is thereby selected as a primary key for sorting the table. The user may also select by invoking the GUI control (504) to have the rows of the table sorted in ascending order of the primary key or select by invoking the control (508) to have the rows of the table sorted in descending order of the primary key.

Figure 6:
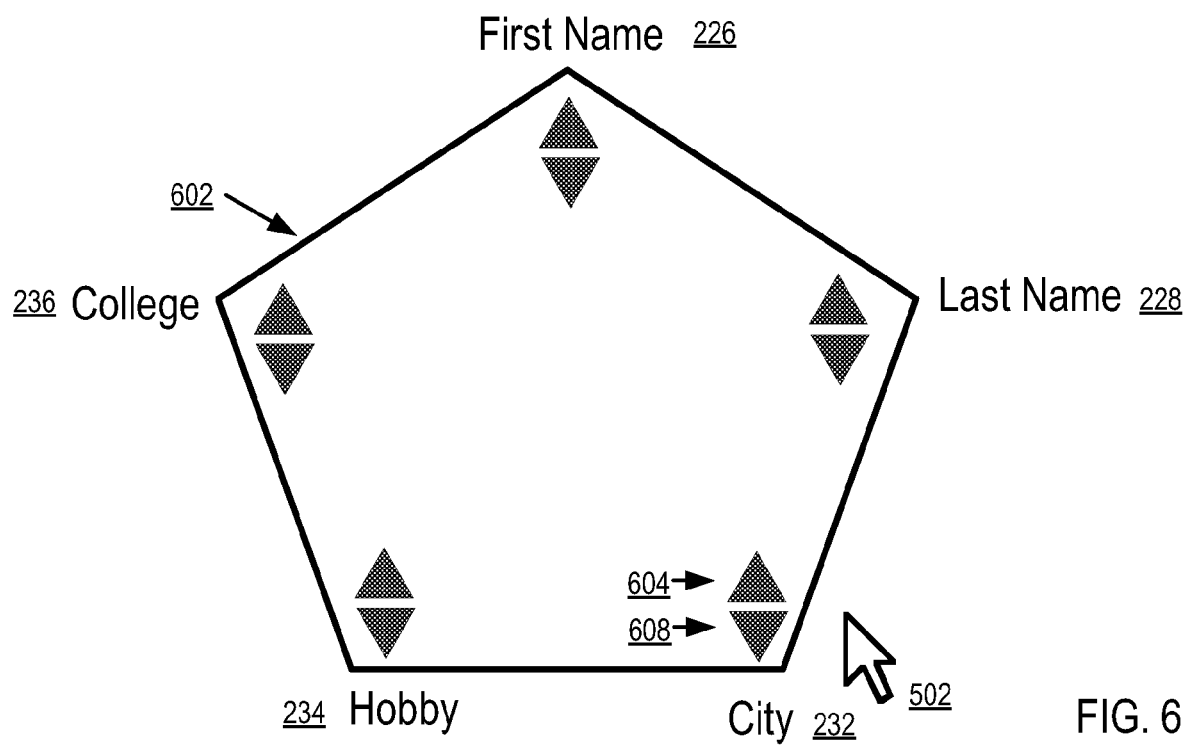
FIG. 6 sets forth a block diagram of the display of a GUI useful in accepting a user's selection of a secondary key for sorting the table already sorted according to the primary key selected in the example of FIG. 5.

Turning now to FIG. 6, FIG. 6 sets forth a block diagram of the display of a GUI useful in accepting a user's selection of a secondary key for sorting the table already sorted according to the primary key selected in the example of FIG. 5. The example display of FIG. 6 includes the table (202) sorted now according to the user's selection of the column age (208) as the primary key.

In the example display of FIG. 6, a representative shape (602) for displaying sort options available to the user for selecting the secondary key is displayed. The example representative shape (602) selected in the example of FIG. 6 is a five-sided polygon having the same number of vertices as remaining columns in the table available for selection as the secondary key for sorting. In the example of FIG. 6, the columns in the table available for selection as the secondary key for sorting are identified and identifications (226, 228, 232, 234, and 236) of those columns (204, 206, 210, 220 and 224) are displayed together in the GUI with the representative five-sided shape (602). In the example of FIG. 6, the identifications (226, 228, 232, 234, and 236) are themselves implemented as GUI controls that a user may invoke to select the identified column as the secondary key for sorting the table.

The example displayed GUI of FIG. 6 includes a GUI control (232) for accepting a user's selection of the column (210) for city as a secondary key for sorting. In the example of FIG. 6 the GUI control (232) for selecting city as the secondary key for sorting the table is invoked using a mouse cursor (502). The column for age (208) is thereby selected as the secondary key for sorting the table. The user may also select by invoking the GUI control (604) to have the rows of the table sorted in ascending order of the secondary key or select by invoking the control (708) to have the rows of the table sorted in descending order of the secondary key.

Figure 7:
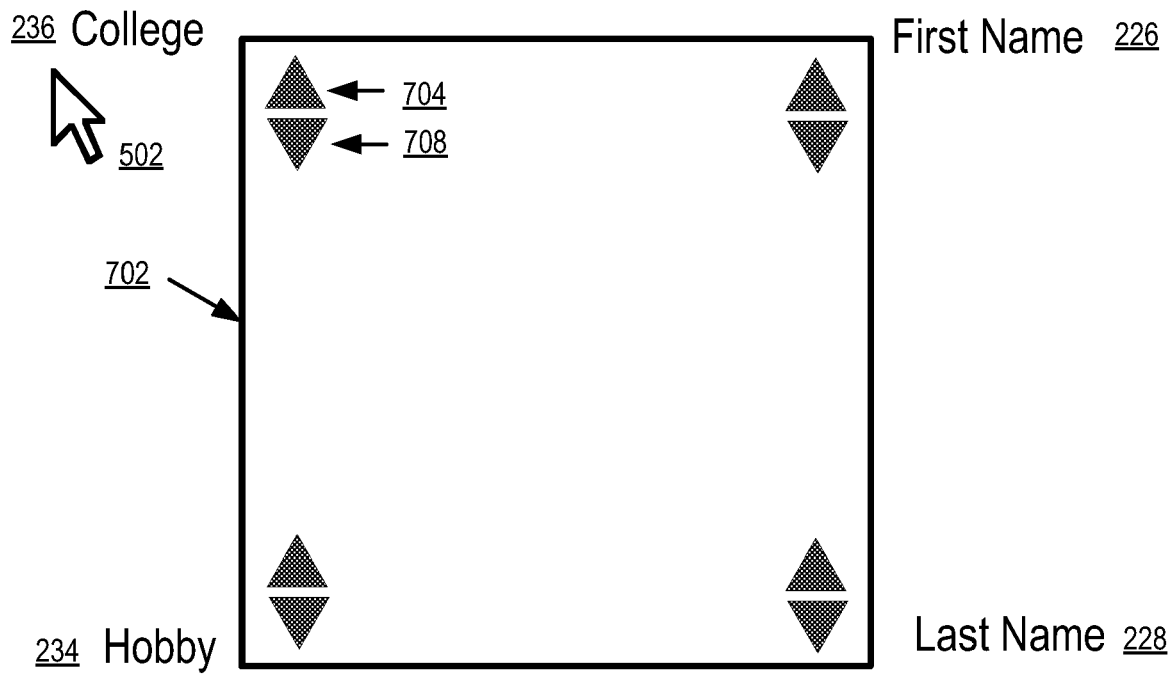
FIG. 7 sets forth a block diagram of the display of a GUI useful in accepting a user's selection of a tertiary key for sorting the table already sorted according to the primary key selected in the example of FIG. 5 and the secondary key selected in the example of FIG. 6.

Turning now to FIG. 7, FIG. 7 sets forth a block diagram of the display of a GUI useful in accepting a user's selection of a tertiary key for sorting the table already sorted according to the primary key selected in the example of FIG. 5 and the secondary key selected in the example of FIG. 6. The example display of FIG. 7 includes the table (202) sorted now according to the user's selection of the column age (208) as the primary key and the user's selection of column city (210) as the secondary key.

In the example display of FIG. 7, a representative shape (702) for displaying sort options available to the user for selecting the tertiary key is displayed. The example representative shape (702) selected in the example of FIG. 7 is a four-sided polygon having the same number of vertices as remaining columns in the table available for selection as the tertiary key for sorting. In the example of FIG. 7, the columns in the table available for selection as the tertiary key for sorting are identified and identifications (226, 228, 234, and 236) of those columns (204, 206, 220 and 224) are displayed together in the GUI with the representative four-sided shape (702). In the example of FIG. 7, the identifications (226, 228, 234, and 236) are themselves implemented as GUI controls that a user may invoke to select the identified column as the tertiary key for sorting the table.

The example displayed GUI of FIG. 7 includes a GUI control (236) for accepting a user's selection of the column (224) for college as the tertiary key for sorting. In the example of FIG. 7 the GUI control (236) for selecting college as the tertiary key for sorting the table is invoked using a mouse cursor (502). The column for college (224) is thereby selected as the tertiary key for sorting the table. The user may also select by invoking the GUI control (704) to have the rows of the table sorted in ascending order of the tertiary key or select by invoking the control (708) to have the rows of the table sorted in descending order of the tertiary key.

Turning now to FIG. 8, FIG. 8 sets forth a block diagram of the table sorted according to the primary key selected in the example of FIG. 5, the secondary key selected in the example of FIG. 6, and the tertiary key selected in the example of FIG. 7. The table of FIG. 8 is sorted first by age, then by city, and then by college.

Figure 9:
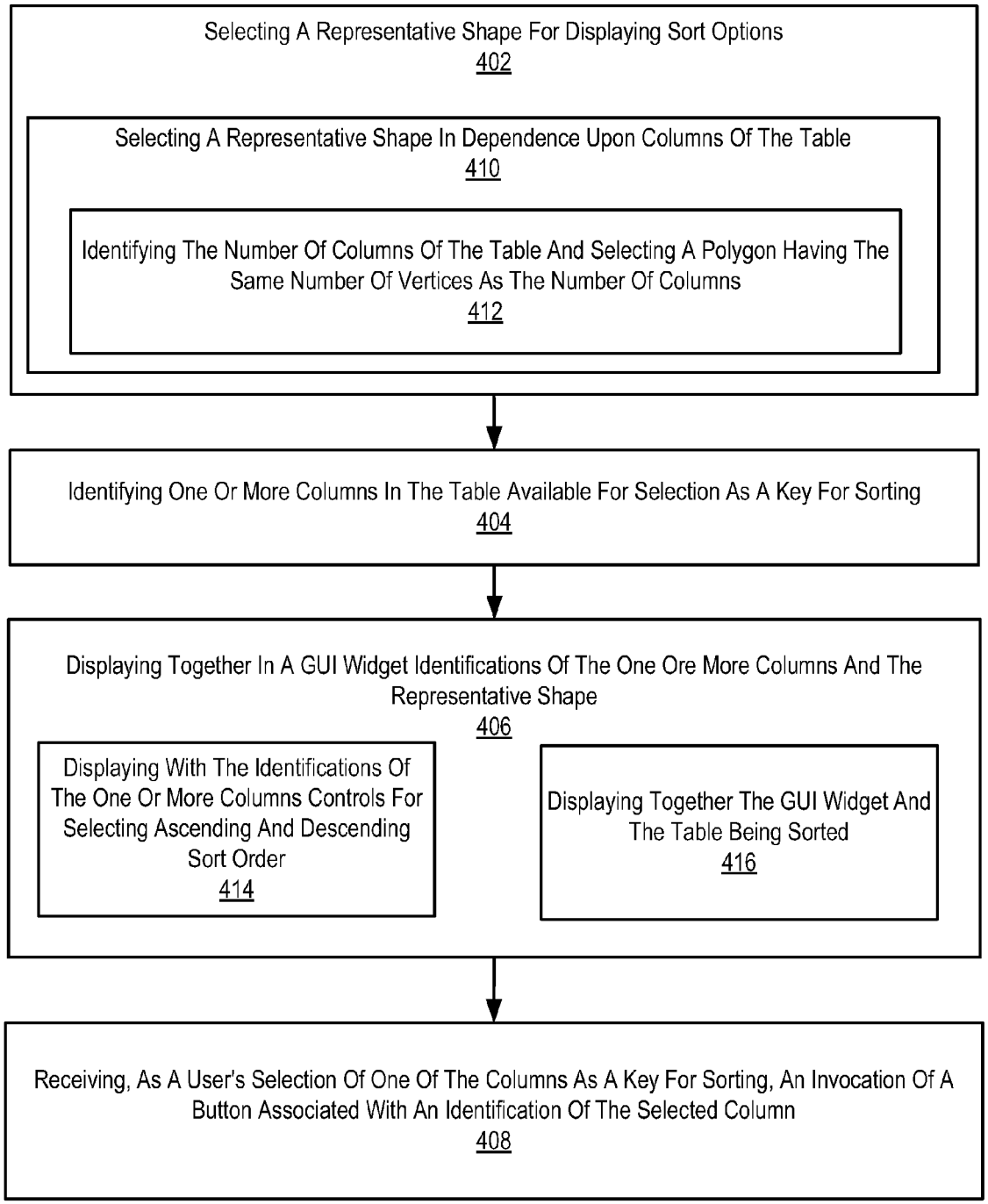
FIG. 9 sets forth a flow chart illustrating an exemplary method for accepting a user's selection of sort options for sorting a table according to embodiments of the present invention.

For further explanation, FIG. 9 sets forth a flow chart illustrating an exemplary method for accepting a user's selection of sort options for sorting a table according to embodiments of the present invention. The method of FIG. 9 includes selecting (402) a representative shape for displaying sort options. The representative shape may be polygon, circle of particular size, a line, a curve, or other shape that will occur to those of skill in the art.

In the method of FIG. 9, selecting (402) a representative shape includes selecting (410) a representative shape in dependence upon columns of the table. Selecting (410) a representative shape includes identifying (412) the number of columns of the table available for selection as a key for sorting and selecting a polygon having the same number of vertices as the number of columns available for selection as a key for sorting.

The method of FIG. 9 also includes identifying (404) one or more columns in the table available for selection as a key for sorting. Identifying (404) one or more columns in the table available for selection as a key for sorting may include identifying any column not already selected as a key for sorting the table, identifying a columns selected as a key in previous sorts, identifying the column most commonly selected as a key for sorting, identifying the first or next column in the table as the key for sorting, or any way of identifying a column in a table as will occur to those of skill in the art.

The method of FIG. 9 also includes displaying (406), together in a GUI, identifications of the one or more columns and the representative shape. Displaying (406), together in a GUI, identifications of the one or more columns and the representative shape provides a user with an improved visual representation of the sort options available for sorting the table. In some embodiments displaying (406) the identifications of the one or more columns and the representative shape may be carried out by displaying the identifications of the columns at each vertex of a polygon having the same number of vertices as columns available for selection as a key for sorting.

In the method of FIG. 9, displaying (406), together in a GUI, identifications of the one or more columns available for selection as a key for sorting and the representative shape includes displaying (414) with the identifications of the one or more columns GUI controls for selecting ascending and descending sort order. Such GUI controls may be implemented as GUI buttons such as those described above in the examples of FIGS. 3-8.

In the method of FIG. 9, displaying (406), together in a GUI, identifications of the one or more columns available for selection as a key for sorting and the representative shape also includes displaying (416) together the representative shape and the table being sorted. Displaying (416) together the representative shape and the table being sorted may be carried out by displaying the representative shape near the table as described above with reference to FIG. 3, displaying the representative shape on top of the table as described above with reference to FIG. 4, or in other ways as will occur to those of skill in the art.

The method of FIG. 9 also includes receiving (408), as a user's selection of one of the columns as a key for sorting, an invocation of a GUI control associated with an identification of the selected column. Receiving (408), as a user's selection of one of the columns as a key for sorting, an invocation of a GUI control associated with an identification of the selected column may be carried out through the use of a mouse pointer as described above with reference to FIGS. 5-7.

As mentioned above many database applications provide the ability to sort on multiple keys. That is, a table may be first sorted on a primary key, then sorted on a secondary key, and then on a tertiary key and so on as will occur to those of skill in the art. For further explanation, FIG. 10 sets forth a flow chart illustrating an additional exemplary method for accepting a user's selection of sort options for sorting a table according to embodiments of the present invention that includes sorting on more than one key. The method of FIG. 10 is similar to the method of FIG. 9 in that the method of FIG. 10 includes selecting (402) a representative shape for displaying sort options; identifying (404) one or more columns in the table available for selection as a key for sorting; displaying (406), together in a GUI, identifications of the one or more columns and the representative shape; and receiving (408), as a user's selection of one of the columns as a key for sorting, an invocation of a GUI control associated with an identification of the selected column.

Figure 10:
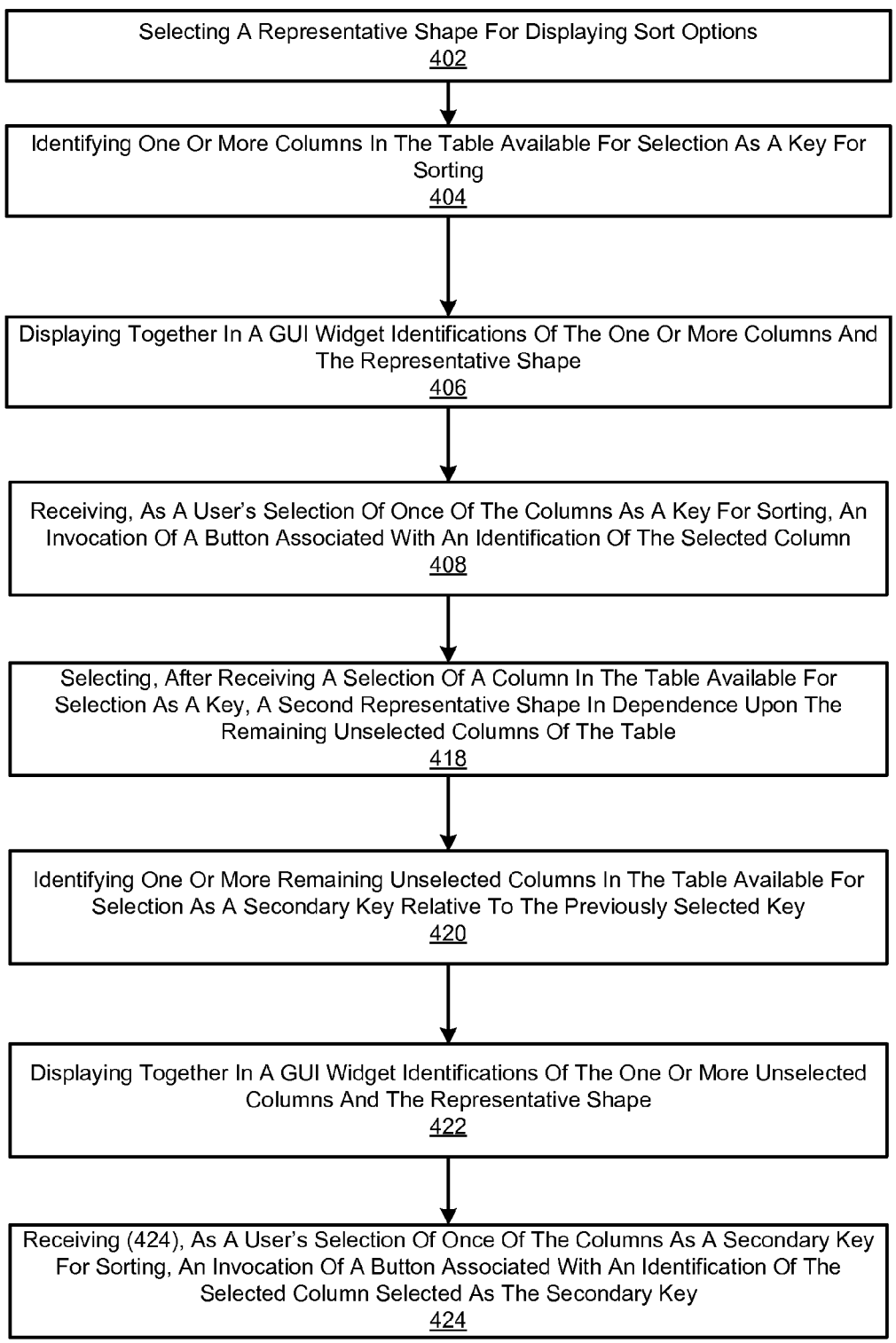
FIG. 10 sets forth a flow chart illustrating an additional exemplary method for accepting a user's selection of sort options for sorting a table according to embodiments of the present invention that includes sorting on more than one key.

The method of FIG. 10 differs from the method of FIG. 9 in that the method of FIG. 10 also includes selecting (418), after receiving a selection of a column in the table available for selection as a key, a second representative shape in dependence upon the remaining unselected columns of the table; identifying (420) one or more remaining unselected columns in the table available for selection as a secondary key relative to the previously selected key, wherein the one or more remaining unselected columns are not selected as a key for sorting; displaying (422), together in a GUI, identifications of the one or more columns and the representative shape; and receiving (424), as a user's selection of one of the columns as a secondary key for sorting, an invocation of a GUI control associated with an identification of the selected column selected as the secondary key.

Turning to the method of FIG. 10 in more detail, the method of FIG. 10 includes selecting (418), after receiving a selection of a column in the table available for selection as a key, a second representative shape in dependence upon the remaining unselected columns of the table. Selecting (418) a second representative shape in dependence upon the remaining unselected columns of the table may include selecting a polygon having the same number of vertices as the number of columns available for selection as a secondary key, tertiary key, and so on as described above with reference to FIGS. 5-8.

The method of FIG. 10 also includes identifying (420) one or more remaining unselected columns in the table available for selection as a secondary key relative to the previously selected key. Identifying (420) one or more remaining unselected columns in the table available for selection as a secondary key relative to the previously selected key may include identifying any column not already selected as a key for sorting the table, identifying columns previously selected as secondary keys for previous sorts, identifying the most commonly used columns as secondary keys, identifying a next ordered column in a table as the secondary key for sorting, or any way of identifying a column in a table as will occur to those of skill in the art.

The method of FIG. 10 also includes displaying (422), together in a GUI, identifications of the one or more unselected columns and the representative shape. Displaying (422), together in a GUI, identifications of the one or more columns and the representative shape provides a user with an improved visual representation of the sort options available for sorting the table. In some embodiments displaying (422) the identifications of the one or more unselected columns and the representative shape may be carried out by displaying the identifications of the columns at each vertex of a polygon having the same number of vertices as unselected columns available for selection as a secondary, tertiary, or other secondary key for sorting.

The method of FIG. 10 also includes receiving (424), as a user's selection of one of the columns as a secondary key for sorting, an invocation of a GUI control associated with an identification of the selected column selected as the secondary key. Receiving (424), as a user's selection of one of the columns as a secondary key for sorting, an invocation of a GUI control associated with an identification of the selected column selected as the secondary key may be carried out through the use of a mouse pointer as described above with reference to FIGS. 5-7.

Exemplary embodiments of the present invention are described largely in the context of a fully functional computer system for accepting a user's selection of sort options for sorting a table according to embodiments of the present invention. Readers of skill in the art will recognize, however, that the present invention also may be embodied in a computer program product disposed on signal bearing media for use with any suitable data processing system. Such signal bearing media may be transmission media. Alternatively, embodiments are embodied in recordable media or devices for machine-readable information, including magnetic media, optical media, or other suitable media. Examples of recordable media or devices include magnetic disks in hard drives or diskettes, compact disks for optical drives, magnetic tape, and others as will occur to those of skill in the art. Examples of transmission media include telephone networks for voice communications and digital data communications networks such as, for example, Ethernets.TM. and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of accepting a user's selection of sort options for sorting a table, the method comprising:

selecting a first representative shape for displaying the sort options, wherein the selecting of the first representative shape further comprises selecting the first representative shape in dependence upon columns of the table, wherein the selecting of the first representative shape further comprises identifying the number of columns of the table available for selection as a key for sorting and selecting a polygon having the same number of vertices as the number of columns available for selection as the key for sorting, wherein the key comprises a primary key;

identifying one or more of the columns in the table available for selection as the key for sorting;

displaying, together in a graphical user interface ('GUI'), identifications of the one or more columns and the first representative shape, wherein the displaying, together in the GUI, identifications of the one or more columns available for selection as a key for sorting and the first representative shape further comprise displaying together the representative shape and the table being sorted;

receiving, as a user's selection of one of the columns as the primary key for sorting, an invocation of a GUI control associated with an identification of the selected column;

selecting, after receiving a selection of a column in the table available for selection as the primary key, a second representative shape having the same number of vertices as the number of remaining unselected columns of the table;

identifying one or more remaining unselected columns in the table available for selection as a secondary key relative to the primary key;

displaying, together in a GUI, identifications of the one or more unselected columns and the second representative shape; and receiving, as a user's selection of one of the columns as the secondary key for sorting, an invocation of a GUI control associated with an identification of the selected column selected as the secondary key.

2. The method of claim 1 wherein displaying, together in a GUI, identifications of the one or more columns available for selection as a key for sorting and the representative shape further comprises displaying with the identifications of the one or more columns GUI controls for selecting ascending and descending sort order.

3. The method of claim 1 further comprising:
selecting, after receiving a selection of a column in the table available for selection as the secondary key, a third representative shape in dependence upon the remaining unselected columns of the table;
identifying one or more remaining unselected columns in the table available for selection as a tertiary key relative to the primary key and the secondary key;
displaying, together in a GUI, identifications of the one or more unselected columns and the third representative shape; and
receiving, as a user's selection of one of the columns as the tertiary key for sorting, an invocation of a GUI control associated with an identification of the selected column selected as the tertiary key.

4. A system for accepting a user's selection of sort options for sorting a table, the apparatus comprising a computer processor, a computer memory operatively coupled to the computer processor, the computer memory having disposed within it computer program instructions configured to:
select a first representative shape for displaying the sort options, wherein the selection of the first representative shape further comprises selection of the first representative shape in dependence upon columns of the table, wherein the selection of the first representative shape further comprises identification of the number of columns of the table available for selection as a key for sorting and selection of a polygon having the same number of vertices as the number of columns available for selection as the key for sorting, wherein the key comprises a primary key;
identify one or more columns in the table available for selection as a key for sorting;
display, together in a graphical user interface ('GUI'), identifications of the one or more columns and the first representative shape, wherein the display, together in the GUI, identifications of the one or more columns available for selection as a key for sorting and the first representative shape further comprises display together of the representative shape and the table being sorted;
receive, as a user's selection of one of the columns as the primary key for sorting, an invocation of a GUI control associated with an identification of the selected column;
select, after receiving a selection of a column in the table available for selection as the primary key, a second representative shape having the same number of vertices as the number of remaining unselected columns of the table;
identify one or more remaining unselected columns in the table available for selection as a secondary key relative to the primary key;
display, together in a GUI, identifications of the one or more unselected columns and the representative shape; and
receive, as a user's selection of one of the columns as the secondary key for sorting, an invocation of a GUI control associated with an identification of the selected column selected as the secondary key.

5. The system of claim 4 wherein computer program instructions configured to display, together in a GUI, identifications of the one or more columns available for selection as a key for sorting and the representative shape further comprise computer program instructions configured to display with the identifications of the one or more columns GUI controls for selecting ascending and descending sort order.

6. The system of claim 4 wherein the computer memory also has disposed within it computer program instructions configured to:
select, after receiving a selection of a column in the table available for selection as the secondary key, a third representative shape in dependence upon the remaining unselected columns of the table;
identify one or more remaining unselected columns in the table available for selection as a tertiary key relative to the primary key and the secondary key;
display, together in a GUI, identifications of the one or more unselected columns and the third representative shape; and
receive, as a user's selection of one of the columns as the tertiary key for sorting, an invocation of a GUI control associated with an identification of the selected column selected as the tertiary key.

7. A computer program product for accepting a user's selection of sort options for sorting a table, the computer program product disposed in a computer readable device, the computer program product comprising:
computer program instructions for selecting a first representative shape for displaying the sort options, wherein the selecting of the representative shape further comprises selecting the first representative shape in dependence upon columns of the table, wherein the selecting of the first representative shape further comprises identifying the number of columns of the table available for selection as a key for sorting and selecting a polygon having the same number of vertices as the number of columns available for selection as the key for sorting, wherein the key comprises a primary key;
computer program instructions for identifying one or more of the columns in the table available for selection as the key for sorting;
computer program instructions for displaying, together in a graphical user interface ('GUI'), identifications of the one or more columns and the first representative shape, wherein the computer program instructions for displaying, together in the GUI, identifications of the one or more columns available for selection as a key for sorting and the first representative shape further comprise computer program instructions for displaying together the first representative shape and the table being sorted;
computer program instructions for receiving, as a user's selection of one of the columns as the primary key for sorting, an invocation of a GUI control associated with an identification of the selected column;
computer program instructions for selecting, after receiving a selection of a column in the table available for selection as the primary key, a second representative shape having the same number of vertices as the number of remaining unselected columns of the table;
computer program instructions for identifying one or more remaining unselected columns in the table available for selection as a secondary key relative to the primary key;
computer program instructions for displaying, together in a GUI, identifications of the one or more unselected columns and the representative shape; and
computer program instructions for receiving, as a user's selection of one of the columns as the secondary key for sorting, an invocation of a GUI control associated with an identification of the selected column selected as the secondary key.

8. The computer program product of claim 7 wherein computer program instructions for displaying, together in a GUI, identifications of the one or more columns available for selection as a key for sorting and the representative shape further comprise computer program instructions for displaying with the identifications of the one or more columns GUI controls for selecting ascending and descending sort order.

9. The computer program product of claim 7, wherein the computer program instructions comprise:

computer program instructions for selecting, after receiving a selection of a column in the table available for selection as the secondary key, a third representative shape in dependence upon the remaining unselected columns of the table;

computer program instructions for identifying one or more remaining unselected columns in the table available for selection as a tertiary key relative to the primary key and the secondary key;

computer program instructions for displaying, together in a GUI, identifications of the one or more unselected columns and the third representative shape; and computer program instructions for receiving, as a user's selection of one of the columns as the tertiary key for sorting, an invocation of a GUI control associated with an identification of the selected column selected as the tertiary key.

* * * * *